United States Patent [19]

Graboyes et al.

[11] 4,249,432
[45] Feb. 10, 1981

[54] RULED SCORING DIE

[76] Inventors: Herman A. Graboyes, 425 Bercado Cir., Mishawaka, Ind. 46544; Simon R. Miller, Jr., 2000 Middlebury St., Elkhart, Ind. 46514

[21] Appl. No.: 71,391

[22] Filed: Aug. 30, 1979

[51] Int. Cl.³ .............................................. B21K 5/20
[52] U.S. Cl. ................................................. 76/107 C
[58] Field of Search ............ 76/107 C, 107 R, 101 R; 93/58.2 R, 58.2 F; 29/464, 465; 83/669, 685

[56] References Cited

U.S. PATENT DOCUMENTS

| | | | |
|---|---|---|---|
| 2,458,867 | 1/1949 | Messersmith | 76/107 C |
| 3,194,090 | 7/1965 | Becker | 76/107 C |

FOREIGN PATENT DOCUMENTS 2445652  4/1975  Fed. Rep. of Germany ........ 76/107 C

*Primary Examiner*—Othell M. Simpson
*Assistant Examiner*—Roscoe V. Parker

[57] ABSTRACT

A die having a scoring rule and an accommodating counter plate for use in paper or similar soft materials scoring operations in which alignment between the scoring rule and the score in the counter plate is accommodated by adjustably positioning a scored counter member for receiving the scoring rule within a slot formed in the counter plate.

4 Claims, 10 Drawing Figures

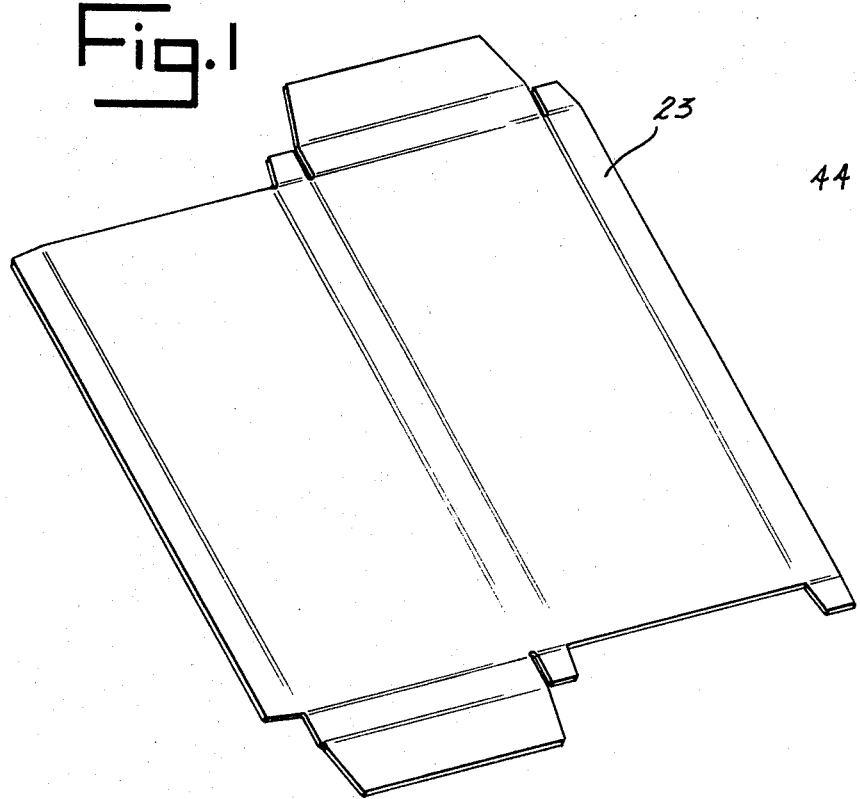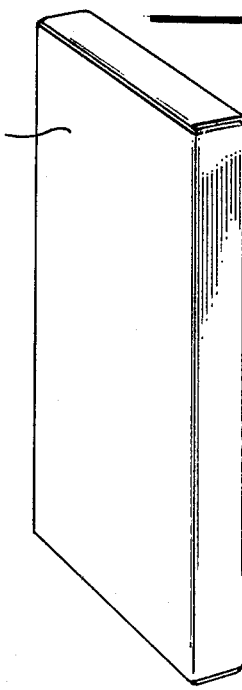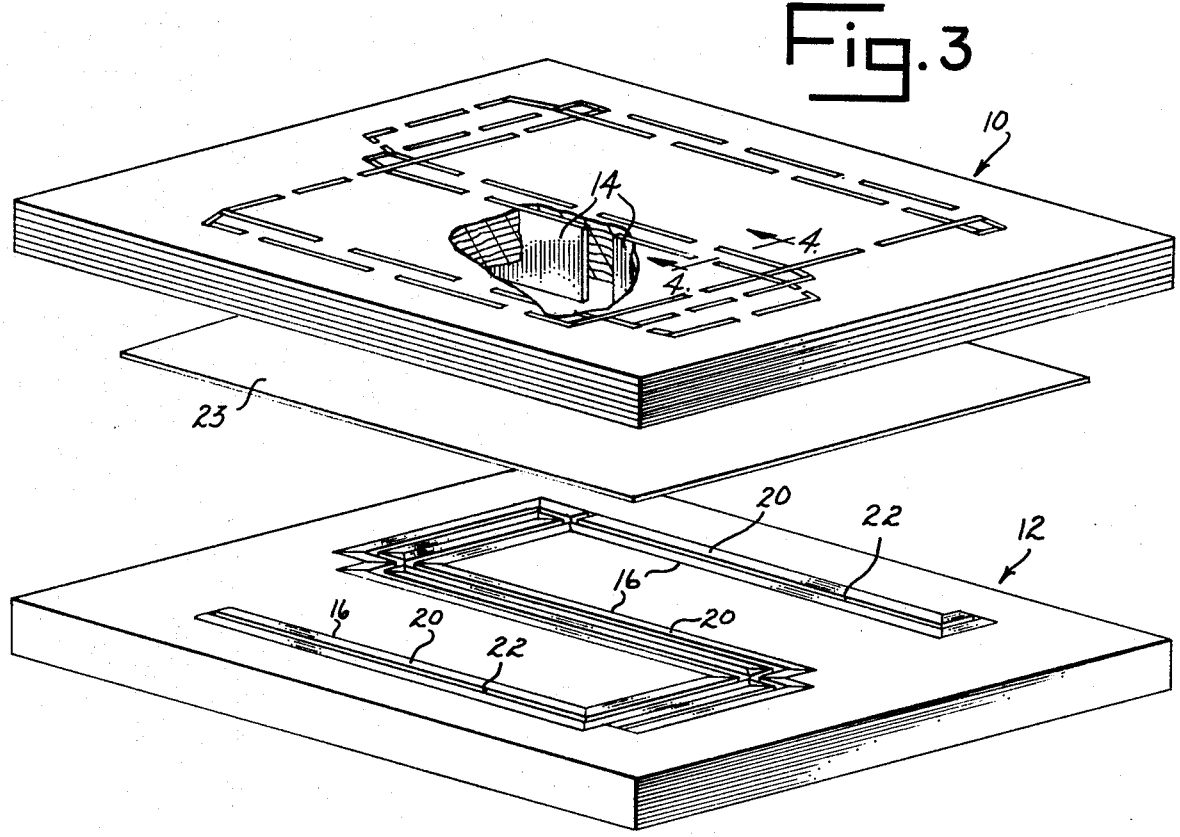

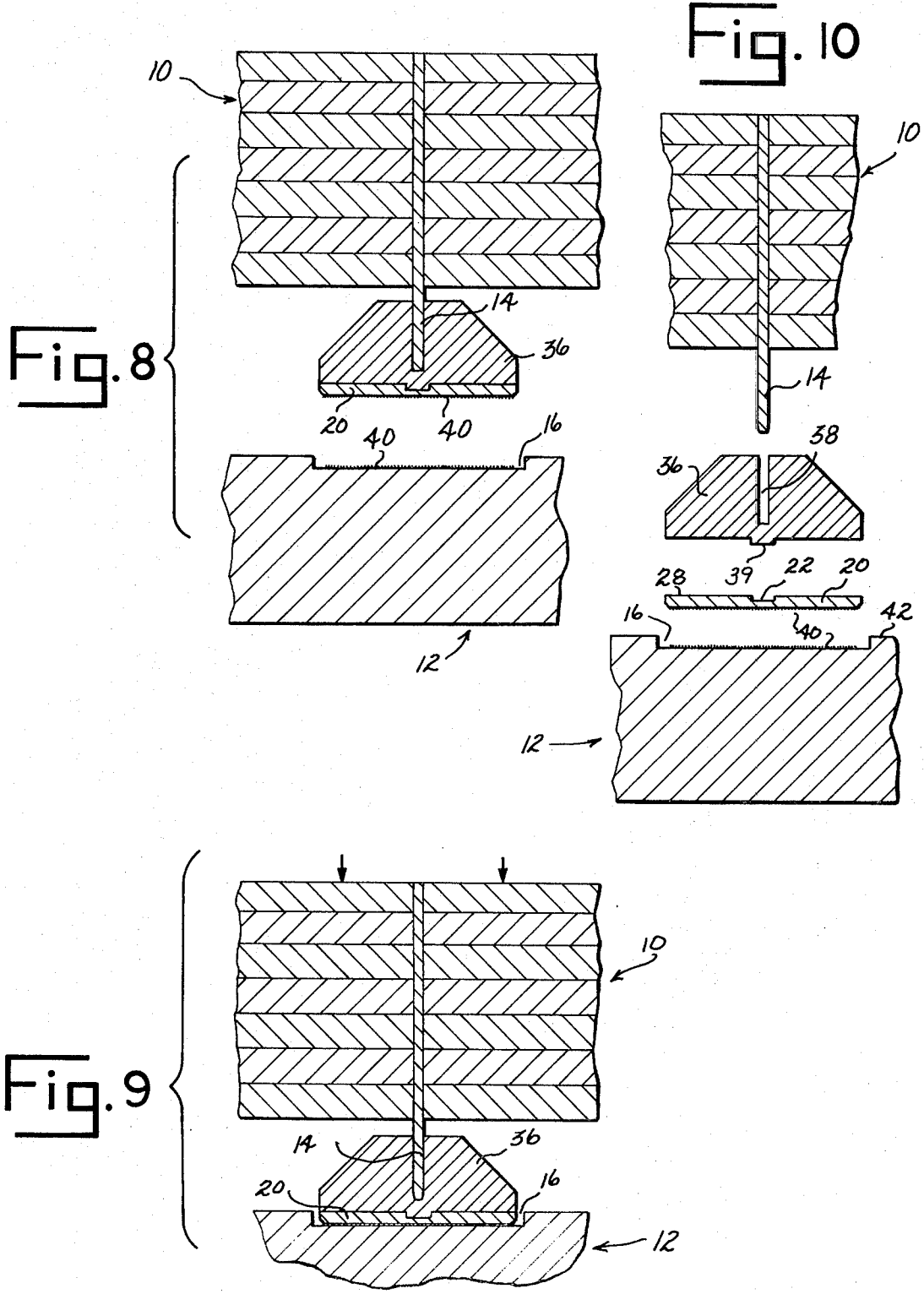

RULED SCORING DIE

SUMMARY OF THE INVENTION

This invention relates to ruled dies for scoring paper or similar soft material and will have specific but not limited application to steel rule scoring dies.

Heretofore a principal problem with steel rule scoring dies has been the alignment of the female counter scores with the male scoring rules. Misalignment of the rule with its accommodating female counter score will cause the work material to be torn or severed instead of simply scored. The alignment of a rule with its score has heretofore required the hand cutting of the female counter score which is time consuming and not always precisely accurate. Computer controlled milling of the female counter plate and chemical etching has also been utilized to provide rule alignment but are expensive procedures adding substantially to the cost of a die.

In this invention the female counter plate is provided with shallow slots into which counter members each having a score or channel formed in it are adjustably fitted. Each channel is sized to accommodate a male rule. The male rule is brought into accommodating alignment with its counter member, resulting in the counter member transversely shifting within its counter plate slot. Once a male rule and its counter members are aligned with the counter member being shiftably positioned within its counter plate slot, the counter member is secured to the counter plate. The die containing the rules and cutting knives and the counter plate carrying the aligned counter members are then pinned or otherwise secured in their respective registered positions for shipment to the user where the die and counter plate are placed in a reciprocating die cutting press. The method and apparatus of this invention reduces downtime at the place of die operation, eliminates the need of skilled craftsmen to align the rules with the female counter plate, and reduces the fabrication time for the die and counter plate.

Accordingly, it is an object of this invention to provide a method of constructing a die having a scoring rule and accommodating counter plate for use in a paper or similar soft material scoring operation.

Another object of this invention is to provide a method of constructing a cutting and scoring die without the need of skilled craftsmen and in a minimum of asembly time.

Still another object of this invention is to provide an ecomonically manufactured steel rule scoring die.

Still another purpose for this invention is to provide a scoring die which is of accurate manufacture and of economical cost.

Other objects of this invention will become apparent upon a reading of the invention's description.

BRIEF DESCRIPTION OF THE DRAWINGS

FIG. 1 is a perspective view of a carton formed by the method and die of this invention in unassembled flat form.

FIG. 2 is a perspective view of the carton of FIG. 1 shown assembled.

FIG. 3 is a perspective view of a cutting and scoring die set having a centering sheet utilized in the alignment operation of the rules of the die positioned between the die and lower counter plate and having a portion of the upper die broken away for purposes of illustration.

FIG. 8 is a fragmentary enlarged sectional view of another embodiment of this invention having the counter member of the female counter plate connected to the rule means of a clip which positions the counter member above the counter plate.

FIG. 9 is a fragmentary sectional view like that of FIG. 8 showing the clip separated from the rule and counter member.

FIG. 10 is a fragmentary sectional view showing the clip-connected counter member positioned within the counter plate.

DESCRIPTION OF THE PREFERRED EMBODIMENTS

Figure 4:
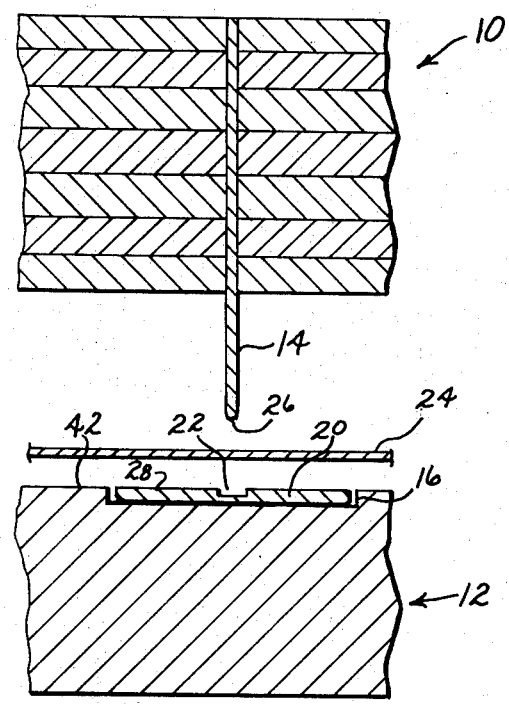
FIG. 4 is a fragmentary sectional view taken along line 4—4 of FIG. 3 and showing the upper die separated from the lower counter plate in preparation for aligning the illustrated rule.
Figure 5:
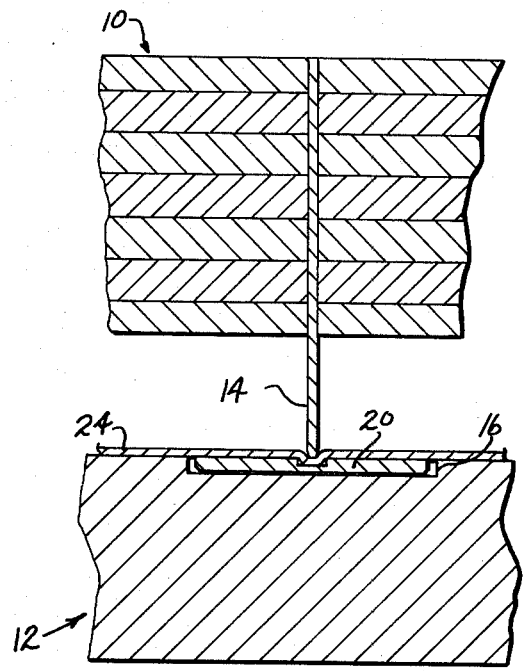
FIG. 5 is a fragmentary sectional view like FIG. 4 showing the rule being aligned with a channeled counter member carried by the lower counter plate.

The embodiments illustrated are not intended to be exhaustive or to limit the invention to the precise forms disclosed. They are chosen and described in order to best explain the invention and its application and practical use to enable others best skilled in the art to best utilize the invention.

In FIG. 3 a die set is shown which includes a male cutting and scoring die 10 and a female counter plate 12. Die 10 is normally formed of laminated wood with the die carrying cutting knives (not shown) and scoring rules 14 fitted into slots cut into the die body. Counter plate 12 is normally of a steel construction and has a plurality of wide slots 16 formed in its die-opposing surface. The slots 16 are generally aligned with rules 14 carried by die 10 and have a function which will now be described.

Slots 16 accommodate counter members 20, best shown in FIGS. 4—7. Each counter member 20 is of a strip form, preferably constructed of metal, having a channel 22 extending along its longitudinal dimension. Each channel 22 is designed to accommodate a rule 14· and is of a width and depth to accommodate work material 23 as it is urged into the channel by the rule to form a crease within the work material. Each slot 16 in counter plate 12 has a width which exceeds the width of its counter member 20 so as to permit the counter member to shift transversely within the counter plate slot. Normally the maximum transverse movement of a counter member 20 within its counter plate slot 16 will be in the range of 0.020 inches.

Figure 6:
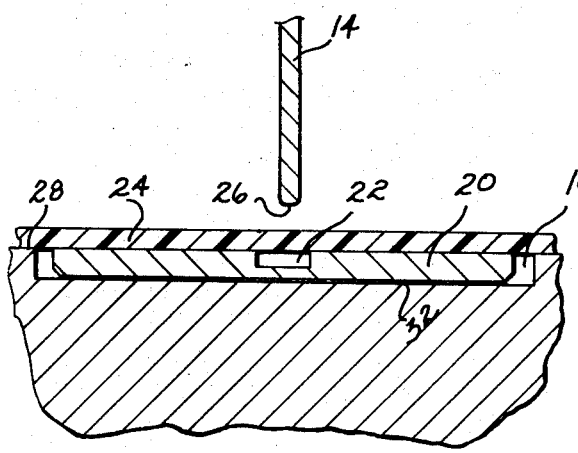
FIG. 6 is a fragmentary enlarged sectional view of a rule approaching the centering sheet located over the female counter plate in preparation for aligning the channeled counter member carried by the plate.
Figure 7:
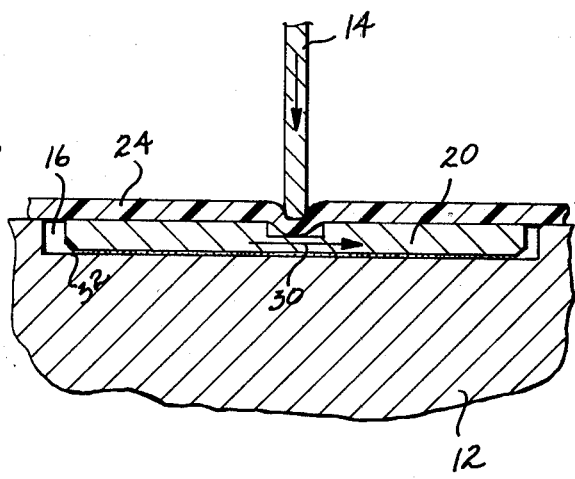
FIG. 7 is a sectional view like that of FIG. 6 showing the counter member in a transverse shiftable movement as the rule is brought into contact with the centering sheet.

The manner in which counter member 20 at its channel 22 is aligned with its rule 14 is illustrated at FIGS. 4—7. A sheet 24 of centering material, which may be of any type of flexible material such as a nylon or similar plastic composition, is placed between the die 10 and counter plate 12. The die and counter plate are then brought or moved together causing each rule 14 to contact sheet 24 and cause the sheet to be compressed between the rule and the underlying counter member 20 at its channel 22. The movement of each rule 14 is such that the rule does not enter the underlying counter member channel 22 but instead stops with its lower end edge 26 generally level with the top surface 28 of the counter member. This allows sheet 24 to be pressed by rule 14 into the channel 22 of the counter member. In FIG. 6 it will be noted that the counter member 20 is positioned so that its channel 22 is slightly offset to the left of the center line of the rule 14. As rule 14 is moved toward counter member 20, as shown in FIG. 7, sheet 24 will be forced into channel 22 of the counter member causing the counter member to be moved slightly to the right as illustrated by arrow 30, thereby centering the channel with respect to the rule. With counter member 20 having its channel 22 centered under rule 14, the counter member is bonded or otherwise secured to counter plate 12. This securement of the counter member 20 to counter plate 12 may be accomplished by delay setting bonding material 32 which is applied to the lower surface of counter member 20 before the counter member is placed within its accommodating counter plate slot 16. Magnets or set screws could also be utilized to secure or clamp the counter member in its aligned position within slot 16 of counter plate 12. If by chance there is a misalignment of one or more of the counter members 20 upon counter plate 12, it is not necessary to destroy or otherwise discard the counter plate as would normally be tha case in the prior art type of counter plates. Instead the affected counter members 20 can be simply detached from the counter plate and repositioned by use of sheet 24 and repeated compressing engagement of the rules 14.

In the embodiment of this invention disclosed in FIGS. 4—7, removable guide pins can be utilized in conjunction with each rule 14 with such guide pins entering accommodating bores in the underlying counter member 20. This causes the counter member to be shifted within its accommodating counter plate slot 16, thereby causing the alignment of the rule with respect to the channel 22 of the counter member. Again, each counter member will be secured to the counter plate by a bonding material or other similar securement means which have been heretofore described.

In FIGS. 8–10, another embodiment of this invention is shown. Each counter member 20 is removably secured to its accommodating rule 14 by a clip part 36. Each clip part 36 includes a center groove 38 into which the ruler 14 is restrictively fitted. Each clip part also includes a rib 39 which is aligned under groove 38 and which fits restrictively into channel 22 of the counter member. With clip 36 interconnecting rule 14 and its associated counter member 20, channel 22 of the counter member will be aligned with the rule. A pressure sensitive adhesive 40 is applied to the lower surface of each channel 22 and within underlying slot 16 of counter plate 12. Die 10 is then moved toward counter plate 12 with each counter member 20 entering its accommodating counter plate slot 16 and being secured to the counter plate by the contacting adhesive 40. With counter members 20 so secured to counter plate 12, die 10 is then moved away from counter plate 12 to cause separation of clip parts 36 from either the rules or counter members with the counter members remaining secured to the underlying counter plate 12. Clips 36 are then removed by hand from the rules or counter members, as the case may be, to which they remain connected. In this manner, each rule 14 is aligned with its accommodating counter member 20. Again, the width of each counter plate slot 16 is sufficient to accommodate the variable placement of a counter member 20.

In each of the above embodiments, the upper surface 28 of each counter member 20 when secured to counter plate 12 lies in substantially the same plane as the upper surface 42 of the counter plate. Through the above described means, rules 14 of die 10 can be precisely aligned with accommodating channels in counter members 20 carried by counter plate 12 so that the box 44 illustrated in its assembled form in FIG. 2 may be cut and scored from suitable paper sheet material 23 in the flattened form illustrated in FIG. 1. The sheet material cut and scored by the die of this invention may be used for any non-ferrous or soft metal material.

It is to be understood that the invention is not to be limited to the details above given but may be modified within the scope of the appended claims.

What we claim is:

1. A method of constructing a die having a scoring rule and accommodating counter plate for use in a paper or similar soft material scoring operation comprising the steps:
   a. Forming a slot in said counter plate,
   b. Providing a counter member having a transverse dimension less than the transverse dimension of said slot, said counter member having a channel formed therein to guidably accommodate said rule when scoring said material as such material is positioned between said rule and said counter member,
   c. Locating said counter member within said counter plate slot with said rule in alignment with said channel of the counter member, and
   d. Securing said counter member to said counter plate in the slot thereof while said rule is aligned with the counter member channel.

2. The method of claim 1 wherein step c includes positioning said counter member in said counter plate slot spacedly under said rule, inserting a sheet of flexible material between said counter member and rule, contacting said sheet material with said rule over said channel of the counter member to compress said material into said channel and thereby cause said counter member to shift laterally within said counter plate slot in aligning the channel therein with said rule.

3. The method of claim 2 wherein a timed delay setting adhesive is applied between said counter member a counter plate in the slot thereof, and step d includes delaying removing said rule from compressing contact with said sheet material until said adhesive is set.

4. The method of claim 1 wherein step c includes detachably connecting said rule to said counter member with said rule in alignment with said counter member channel, shifting said rule and connected counter plate as a unit to position said counter plate within said counter plate slot, and after step d detaching said rule from the counter member.

\* \* \* \* \*